US012621746B2

(12) United States Patent
Yao

(10) Patent No.: US 12,621,746 B2
(45) Date of Patent: May 5, 2026

(54) METHOD FOR DETERMINING TRANSMISSION DELAY AND ELECTRONIC DEVICE

(71) Applicant: Huawei Technologies Co., Ltd., Shenzhen (CN)

(72) Inventor: Songping Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 18/248,936

(22) PCT Filed: Sep. 24, 2021

(86) PCT No.: PCT/CN2021/120217
§ 371 (c)(1),
(2) Date: Apr. 13, 2023

(87) PCT Pub. No.: WO2022/078183
PCT Pub. Date: Apr. 21, 2022

(65) Prior Publication Data
US 2024/0007928 A1 Jan. 4, 2024

(30) Foreign Application Priority Data

Oct. 13, 2020 (CN) .......................... 202011095023.7

(51) Int. Cl.
*H04W 40/24* (2009.01)
*H04L 41/50* (2022.01)
*H04L 43/0852* (2022.01)

(52) U.S. Cl.
CPC ....... *H04W 40/246* (2013.01); *H04L 41/5058* (2013.01); *H04L 43/0852* (2013.01)

(58) Field of Classification Search
CPC ................ H04W 40/246; H04W 8/005; H04L 41/5058; H04L 43/0852; H04L 41/12
See application file for complete search history.

(56) References Cited

U.S. PATENT DOCUMENTS

| 2010/0265931 | A1 | 10/2010 | Loc |
| 2016/0061933 | A1 | 3/2016 | Chung et al. |

(Continued)

FOREIGN PATENT DOCUMENTS

| CN | 107534848 | A | 1/2018 |
| CN | 108923995 | A | 11/2018 |

(Continued)

OTHER PUBLICATIONS

"3rd Generation Partnership Project; Technical Specification Group Services and System Aspects; Proximity-based services (ProSe); Stage 2 (Release 16)",Jul. 9, 2020 (Jul. 9, 2020), XP052297810, 3GPP TS 23.303 v16.0.0, total 130 pages.

(Continued)

*Primary Examiner* — Schquita D Goodwin
(74) *Attorney, Agent, or Firm* — Conley Rose, P.C.

(57) ABSTRACT
A method includes that a first frame from a second electronic device may carry sending time information of the sent first frame, and the first frame is a device discovery beacon frame used for device discovery, a synchronization beacon frame used for synchronization, or a service discovery frame used for service discovery in Wi-Fi aware. After receiving the first frame, a first electronic device may determine a first transmission delay between the first electronic device and the second electronic device based on the sending time information of the first frame and a first time point at which the first frame is received.

20 Claims, 8 Drawing Sheets

(56) References Cited

U.S. PATENT DOCUMENTS

| | | | | |
|---|---|---|---|---|
| 2016/0127246 | A1* | 5/2016 | Ashwood-Smith | ............................ H04L 43/062 370/350 |
| 2016/0323819 | A1 | 11/2016 | Yang et al. | |
| 2019/0014610 | A1* | 1/2019 | Liu | ........................ H04W 8/005 |
| 2019/0166572 | A1* | 5/2019 | Abraham | ............ H04W 56/003 |
| 2021/0127250 | A1* | 4/2021 | Dees | .................... H04W 56/001 |
| 2021/0235317 | A1 | 7/2021 | Hu et al. | |
| 2022/0264282 | A1* | 8/2022 | Jung | ...................... H04W 56/00 |
| 2023/0300907 | A1* | 9/2023 | Kalhan | ................. H04W 72/40 370/329 |

FOREIGN PATENT DOCUMENTS

| | | | | |
|---|---|---|---|---|
| CN | 111064629 | A | 4/2020 | |
| WO | WO-2019045765 | A1 * | 3/2019 | ............ H04W 8/005 |
| WO | WO-2020256497 | A1 * | 12/2020 | ............ H04W 76/14 |

OTHER PUBLICATIONS

IEEE Std 802.Nov. 2016, IEEE Standard for Information technology Telecommunications and information exchange between systems Local and metropolitan area networks Specific requirements Part 11: Wireless LAN Medium Access Control (MAC) and Physical Layer (PHY) Specifications, Dec. 7, 2016, total 3534 pages.

* cited by examiner

Electronic device 1400

METHOD FOR DETERMINING TRANSMISSION DELAY AND ELECTRONIC DEVICE

CROSS-REFERENCE TO RELATED APPLICATIONS

This is a U.S. National Stage of International Patent Application No. PCT/CN2021/120217 filed on Sep. 24, 2021, which claims priority to Chinese Patent Application No. 202011095023.7 filed on Oct. 13, 2020. Both of the aforementioned applications are hereby incorporated by reference in their entireties.

TECHNICAL FIELD

This application relates to the communications field, and more specifically, to a method for determining a transmission delay and an electronic device in the communications field.

BACKGROUND

In wireless fidelity (wireless-fidelity, Wi-Fi) aware (Aware), electronic devices may discover each other, and after discovering each other, may establish a connection, and transmit data through the established connection. However, in a data transmission process between two electronic devices, an electronic device does not know a transmission delay between the electronic device and the other electronic device. Consequently, a transmission requirement may fail to be met. For example, some data has a high requirement for a transmission delay. In this case, if there is a relatively high transmission delay between two electronic devices, a transmission requirement cannot be met. Therefore, a method for determining a transmission delay is urgently needed.

SUMMARY

Embodiments of this application provides a method liar determining a transmission delay and an electronic device.

According to a first aspect, a method for determining a transmission delay is provided. The method may be performed by a first electronic device, and the first electronic device may be an apparatus, such as a chip system, able to support a function needed by the first electronic device to perform the method. The method includes: A first electronic device receives, at a first time point, a first frame sent by a second electronic device, where a first field in the first frame carries first sending time information of the first frame sent by the second electronic device, and the first frame is a device discovery beacon frame, a synchronization beacon frame, or a service discovery frame of neighbor awareness networking NAN.

The first electronic device determines a first transmission delay between the first electronic device and the second electronic device based on the first time point and the first sending time information.

In the foregoing technical solution, the first frame sent by the second electronic device may carry the sending time information of the sent first frame. In addition, the first frame is a device discovery beacon frame used for device discovery, a synchronization beacon frame used for synchronization, or a service discovery frame used for service discovery in Wi-Fi aware. After receiving the first frame, the first electronic device may determine the first transmission delay between the first electronic device and the second electronic device based on the sending time information of the first frame and the first time point at which the first frame is received. Therefore, the method for determining a transmission delay is provided. This avoids overheads that are generated because dedicated signaling or a dedicated channel is used for delay detection. In addition, if dedicated signaling or a dedicated channel is used, more time is needed to determine a transmission delay. In this embodiment of this application, a device discovery beacon frame, a synchronization beacon frame, or a service discovery frame is used to carry sending time information of the frame, which helps reduce time that is needed to determine a transmission delay.

It should be noted that the device discovery beacon frame, the synchronization beacon frame, or the service discovery frame mentioned in this embodiment of this application refers to a frame type instead of a specific frame.

Optionally, the second electronic device may be a master device in a NAN cluster. The second electronic device may send a device discovery beacon frame, a synchronization beacon frame, or a service discover frame. Optionally, the second electronic device may be a non-master device in a synchronized state in the NAN cluster. The second electronic device may send a synchronization beacon frame or a service discovery frame. Optionally, the second electronic device may be a non-master device in an unsynchronized state in the NAN cluster. In this case, the second electronic device may send a service discovery frame.

The device discovery frame is used by the master device in the NAN cluster to discover a device, and the synchronization beacon frame is used to synchronize an unsynchronized device with a synchronized device in the NAN cluster. The service discovery frame is used for an unsynchronized device or a synchronized device in the NAN cluster to exchange capabilities.

Optionally, if the second electronic device that sends the first frame is the master device in the NAN cluster, the first electronic device may be a non-master device in the NAN cluster or a device that does not belong to the NAN cluster. If the second electronic device that sends the first frame is a non-master device in the NAN cluster, the first electronic device may be the master device in the NAN cluster or a device that does not belong to the NAN cluster. If the second electronic device that sends the first frame does not belong to the NAN cluster, the first electronic device may be any device in the NAN cluster or a device that does not belong to the NAN cluster. In this case, the first electronic device and the second electronic device may form a new NAN cluster.

It may be understood that the device discovery beacon frame may be replaced by a discovery beacon (discovery beacon) frame.

In some possible implementations, the first field is a first reserved field for a NAN attribute field in the first frame.

In the foregoing solution, the first field is the first reserved field for the NAN attribute field in the first frame. This can improve resource utilization. In addition, no additional signaling is needed to indicate the first sending time information of the first frame.

In some possible implementations, the first field includes a first attribute field, a first length field, and a sending time field, a bit carried in the first attribute field is used to indicate that the first field is used to carry the first sending time information, a bit carried in the first length field is used to indicate a length occupied by the sending time field, and a bit carried in the sending time field is used to indicate a sending time point at which the second electronic device sends the first frame.

Optionally, the first sending time information is used to indicate the sending time point at which the second electronic device sends the first frame and the length occupied by the sending time field that carries the sending time.

Optionally, a location relationship among the first attribute field, the first length field, and the sending time field is not limited.

In some possible implementations, if the first electronic device is not synchronized with the second electronic device, that the first electronic device determines a first transmission delay between the first electronic device and the second electronic device based on the first time point and the first time information includes:

The first electronic device determines a second transmission delay between the first electronic device and the second electronic device based on the first time point and the first time information.

After the first electronic device is synchronized with the second electronic device, the first electronic device calibrates the second transmission delay based on clock information for calibration in a synchronization process, to obtain the first transmission delay.

In the foregoing solution, if the first electronic device is not synchronized with the second electronic device, the first electronic device calibrates the determined second transmission delay based on the clock information for calibration in the synchronization process, to obtain the first transmission delay that is relatively accurate.

In some possible implementations, the method further includes: The first electronic device sends a second frame to a third electronic device, where a second field in the second frame carries the first transmission delay, and the second frame is a synchronization beacon frame or a service discovery frame of neighbor awareness networking NAN.

In the foregoing solution, the third electronic device may determine the first transmission delay between the first electronic device and the second electronic device based on the first transmission delay that is carried in the second frame sent by the first electronic device. If data sent by the third electronic device to the second electronic device needs to pass through the first electronic device, the third electronic device may determine, based on the first transmission delay, whether the first transmission delay meets a transmission requirement of the data to be transmitted.

Optionally, the third electronic device may send the first transmission delay between the first electronic device and the second electronic device to a next electronic device, such as the master electronic device in the NAN cluster. Then, the master device in the NAN cluster may send, to each electronic device in the NAN cluster, transmission delays sent by a plurality of electronic devices. In this case, when each electronic device in the NAN cluster needs to transmit data, the electronic device may determine, based on each transmission delay, whether data on a path meets a transmission delay requirement of the data.

Optionally, the first electronic device can send a synchronization beacon frame or a service discovery frame to the master electronic device in the NAN cluster. In this case, the first electronic device may add the first transmission delay to the synchronization beacon frame or the service discovery frame, and send the synchronization beacon frame or the service discovery frame to the master electronic device.

Optionally, the first electronic device may be the master electronic device in the NAN cluster. In this case, the first electronic device may send the determined first transmission delay to each electronic device in the NAN cluster.

Optionally, the third electronic device and the second electronic device may be a same device or different devices.

In some possible implementations, the second field is a second reserved field for a NAN attribute field in the second frame.

In some possible implementations, the second field includes a second attribute field, a second length field, and a transmission delay field, a bit carried in the second attribute field is used to indicate that the second field is used to carry the first transmission delay, a bit carried in the second length field is used to indicate a length occupied by the transmission delay field, and a bit carried in the transmission delay field is used to indicate the first transmission delay.

In the foregoing solution, the second field is the second reserved field for the NAN attribute field in the second frame. This can improve resource utilization. In addition, no additional signaling is needed to indicate the first transmission delay.

In some possible implementations, the method further includes: The first electronic device sends a third frame to a fourth electronic device, where a third field in the third frame carries second sending time information of the third frame sent by the first electronic device, and the second sending time information is used by the fourth electronic device to determine a third transmission delay between the fourth electronic device and the first electronic device.

Optionally, the third frame is a service discovery frame, a synchronization beacon frame, or a device discovery beacon frame. Optionally, the third frame is a reserved field for an attribute field in the third frame that is a service discovery frame, a synchronization beacon frame, or a device discovery beacon frame.

In the foregoing solution, the first electronic device may receive the first frame sent by the second electronic device, where the first frame carries the first sending time information of the sent first frame. The first electronic device determines the first transmission delay between the first electronic device and the second electronic device based on the first sending time information and the first time point at which the first frame is received. The first electronic device may further send the third frame to the fourth electronic device, where the third field in the third frame may carry the second sending time information of the third frame sent by the first electronic device. In this way, the fourth electronic device may determine the third transmission delay between the fourth electronic device and the first electronic device based on the second sending time information and a time point at which the third frame is received.

According to a second aspect, a method for determining a transmission delay is provided. The method includes: A second electronic device sends a first frame to a first electronic device, where a first field in the first frame carries first sending time information of the first frame sent by the second electronic device, the first frame is a device discovery beacon frame, a synchronization beacon frame, or a service discovery frame of neighbor awareness networking NAN, and the first sending time information is used by the first electronic device to determine a first transmission delay between the first electronic device and the second electronic device.

In some possible implementations, the first field is a first reserved field for a NAN attribute field in the first frame.

In some possible implementations, the first field includes a first attribute field, a first length field, and a sending time field, a bit carried in the first attribute field is used to indicate that the first field is used to carry the first sending time information, a bit carried in the first length field is used to indicate a length occupied by the sending time field, and a bit carried in the sending time field is used to indicate a sending time point at which the second electronic device sends the first frame.

In some possible implementations, the method further includes: The second electronic device receives a second frame sent by the first electronic device, where a second field in the second frame carries the first transmission delay, and the second frame is a device synchronization beacon frame or a service discovery frame of neighbor awareness networking NAN.

In some possible implementations, the second field is a second reserved field for a NAN attribute field in the second frame.

In some possible implementations, the second field includes a second attribute field, a second length field, and a transmission delay field, a bit carried in the second attribute field is used to indicate that the second field is used to carry the first transmission delay, a bit carried in the second length field is used to indicate a length occupied by the transmission delay field, and a bit carried in the transmission delay field is used to indicate the first transmission delay.

According to a third aspect, a method for determining a transmission delay is provided. The method includes: A third electronic device receives a second frame sent by a first electronic device, where a second field in the second frame carries a first transmission delay, and the second frame is a device synchronization beacon frame or a service discovery frame of neighbor awareness networking NAN.

In some possible implementations, the second field is a second reserved field for a NAN attribute field in the second frame.

In some possible implementations, the second field includes a second attribute field, a second length field, and a transmission delay field, a bit carried in the second attribute field is used to indicate that the second field is used to carry the first transmission delay, a bit carried in the second length field is used to indicate a length occupied by the transmission delay field, and a bit carried in the transmission delay field is used to indicate the first transmission delay.

According to a fourth aspect, this application provides an apparatus. The apparatus is included in an electronic device, and the apparatus has a function of implementing behavior of the electronic device according to the foregoing aspects and the possible implementations of the foregoing aspects. The function may be implemented by hardware, or may be implemented by executing corresponding software by hardware. The hardware or the software includes one or more modules or units corresponding to the foregoing function, for example, a display module or unit, a detection module or unit, or a processing module or unit.

Optionally, the apparatus may be the foregoing first electronic device, second electronic device, third electronic device, or fourth electronic device.

According to a fifth aspect, this application provides an electronic device, including one or more processors, a memory, a plurality of application programs, and one or more computer programs. The one or more computer programs are stored in the memory. The one or more computer programs include instructions. When the instructions are executed by the electronic device, the electronic device is enabled to perform the method for determining a transmission delay according to any possible implementation of any one of the foregoing aspect.

Optionally, the electronic device may further include a touchscreen and/or a camera. The touchscreen includes a touch-sensitive surface and a display.

Optionally, the electronic device may be the foregoing first electronic device, second electronic device, third electronic device, or fourth electronic device.

According to a sixth aspect, this application provides an electronic device, including one or more processors, and one or more memories. The one or more memories are coupled to the one or more processors. The one or more memories are configured to store computer program code. The computer program code includes computer instructions. When the one or more processors execute the computer instructions, the electronic device is enabled to perform the method for determining a transmission delay according to any possible implementation of any one of the foregoing aspects.

According to a seventh aspect, this application provides a computer-readable storage medium that includes computer instructions. When the computer instructions are executed on an electronic device, the electronic device is enabled to perform the method for determining a transmission delay according to any possible implementation of any one of the foregoing aspects.

According to an eighth aspect, this application provides a computer program product. When the computer program product runs on an electronic device, the electronic device is enabled to perform the method for determining a transmission delay according to any possible implementation of any one of the foregoing aspects.

DESCRIPTION OF EMBODIMENTS

The following describes the technical solutions in embodiments of this application with reference to the accompanying drawings in embodiments of this application.

It should be understood that d of manners, cases, types, and embodiments in embodiments of this application are merely for ease of description, but should not constitute a special limitation, and features in various manners, types, cases, and embodiments may be combined when there is no contradiction.

It should be further understood that the terms "first", "second", and "third" in embodiments of this application are merely used for distinguishing, and should not be construed as any limitation on this application. Further, it should be understood that sequence numbers of the processes do not mean execution sequences in various embodiments of this application. The execution sequences of the processes should be determined based on functions and internal logic of the processes, and should not be construed as any limitation on the implementation processes of embodiments of this application.

Figure 1:
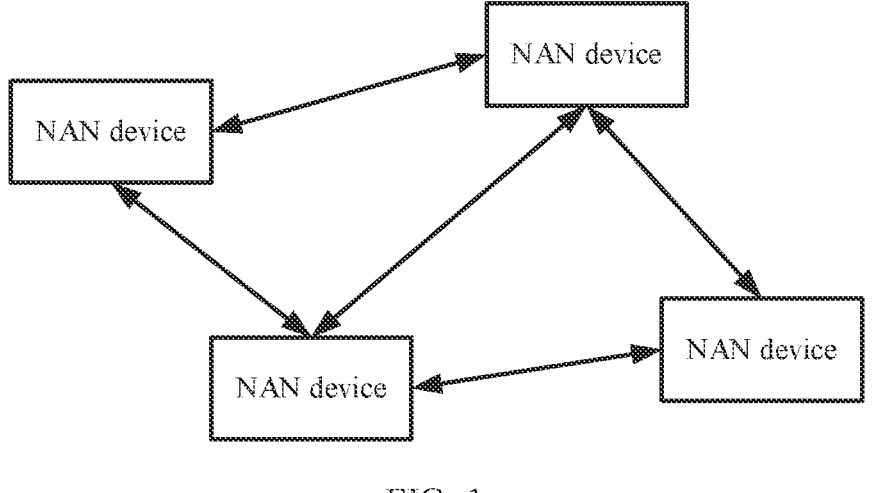
FIG. 1 is a schematic diagram of a NAN cluster according, to an embodiment of this application.

As shown in FIG. 1, before establishing a connection, a NAN device may sense, in advance by using a Wi-Fi aware technology, a surrounding NAN device and a service supported by the surrounding NAN device. In this way, a plurality of NAN devices may be associated to form a NAN cluster. All NAN devices in the NAN cluster share a same parameter set. The NAN cluster includes a master (master) NAN device and a non-master (non-master) NAN device. One NAN device may belong to different NAN clusters. Wi-Fi aware is also referred to as neighbor awareness networking (neighbor awareness networking, NAN). In a process in which a Wi-Fi device uses the Wi-Fi aware technology for sensing, a relatively small quantity of messages are sent, and power consumption is relatively low. For example, in a media resource sharing scenario, a Wi-Fi device may use the Wi-Fi aware technology to discover a surrounding Wi-Fi device, so as to share a media resource.

The NAN device in embodiments of this application may also be referred to as a terminal device, user equipment (user equipment, UE), a mobile station (mobile station. MS), a mobile terminal (mobile terminal, MT), or the like that supports Wi-Fi. The terminal device in embodiments of this application may be a mobile phone (mobile phone), a tablet (Pad), or a computer with a wireless transceiver function, or may be a wireless terminal used in scenarios such as virtual reality (virtual reality, VR), augmented reality (augmented reality, AR), industrial control (industrial control), self driving (self driving), telemedicine (remote medical), a smart grid (smart grid), transportation safety (transportation safety), a smart city (smart city), a smart home (smart home), and the like. In this application, the terminal device and a chip that can be applied to the terminal device are collectively referred to as a terminal device. It should be understood that a specific technology used by and a specific device form of the terminal device are not limited in embodiments of this application. The master NAN device in FIG. 1 may be determined through information exchange among a plurality of NAN devices.

Figure 2:
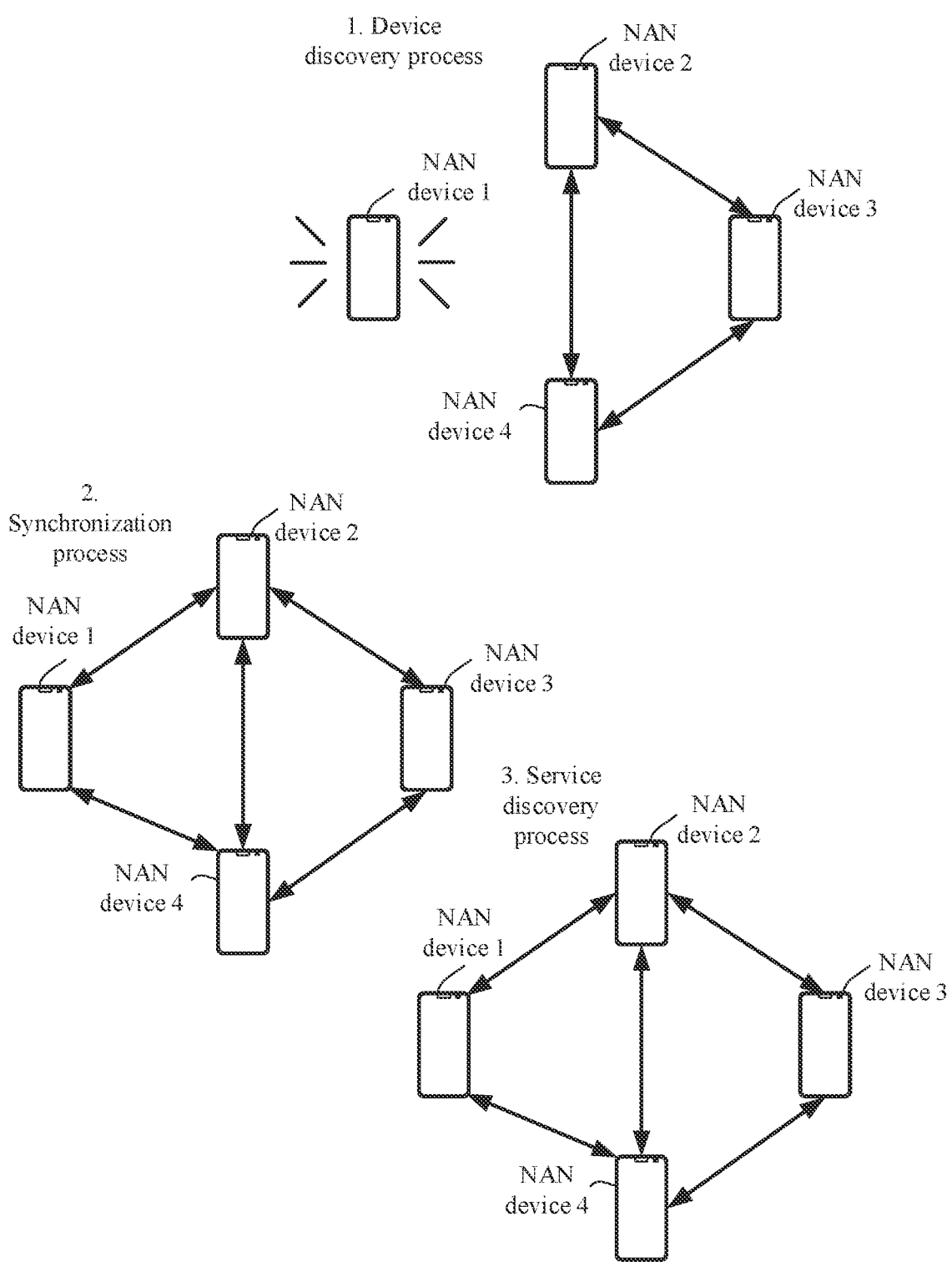
FIG. 2 is a schematic diagram of Wi-Fi aware processes according to an embodiment of this application.
Figure 3:
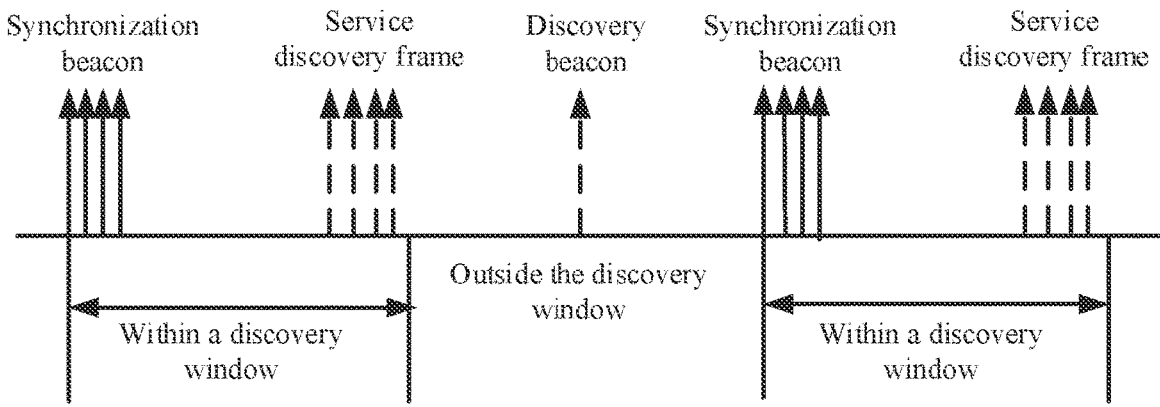
FIG. 3 is a schematic diagram of a Wi-Fi aware process for sending a frame according to an embodiment of this application.

FIG. 2 shows a Wi-Fi aware processes according to an embodiment of this application. There are mainly three processes: a device discovery process, a synchronization process, and a service discovery process. All NAN devices in a NAN cluster share a same transmission parameter set. For example, the transmission parameter set includes a length of a discovery window (discovery window, DW), an interval between DWs, a frame interval, and a NAN channel resource. In the device discovery process, as shown in FIG. 2, the NAN cluster includes a NAN device 1, a NAN device 2, a NAN device 3, and a NAN device 4. Any one of the NAN device 2, the NAN device 3, and the NAN device 4 serves as a master (master) NAN device and may periodically send, outside a DW, a discovery beacon (discovery beacon) frame shown in FIG. 3. The discovery beacon frame is also referred to as a device discovery beacon frame. If receiving the discovery beacon frame, the NAN device 1 may respond to the master NAN device. In this way, the NAN device 1 is discovered. In other words, the NAN device 1 joins the NAN cluster. The discovery beacon frame may include a transmission parameter set of the NAN cluster. In this way, the NAN devices in the NAN cluster can share the transmission parameter set. Some of the NAN devices in the NAN cluster have been synchronized and are in a synchronized state. Some of the NAN devices in the NAN cluster have not been synchronized and are in an unsynchronized state. A NAN device in the synchronized state in the NAN cluster may send a synchronization beacon (synchronization beacon) frame in a discovery window shown in FIG. 3. The synchronization beacon frame may carry clock information and a received signal strength indication (received signal strength indication, RSSI) threshold. In this way, an unsynchronized NAN device in the NAN cluster can determine, based on the RRSI threshold in the received synchronization beacon frame, whether to synchronize, by using the clock information, with the NAN device that sends the synchronization beacon frame, so as to be synchronized with other NAN devices in the NAN cluster. Certainly, a NAN device in the synchronized state in the NAN cluster may also receive the synchronization beacon frame. Both the NAN device in the synchronized state and the NAN device in the unsynchronized state may send service discovery frames in a discovery window. The service discovery frame is used to carry a capability supported by the NAN device. In this way, NAN devices can exchange capabilities, to facilitate subsequent communication.

Any two NAN devices in the NAN cluster may communicate with each other after being synchronized. Before communicating with each other, the two NAN devices need to determine a transmission delay between the two NAN devices, and the NAN devices determine whether the transmission delay meets a transmission requirement. If the transmission delay meets the transmission requirement, data is sent. If the transmission delay does not meet the transmission requirement, another data link that meets the transmission delay may be selected to send data. In a possible implementation, the two NAN devices need to add new interaction signaling based on a Wi-Fi aware protocol, and the two NAN devices use the newly added interaction signaling to determine the transmission delay between the two NAN devices. In this manner, new signaling needs to be added. Consequently, signaling overheads are increased, and duration of detecting the transmission delay is increased, which degrades transmission performance. In another possible implementation, after the two NAN devices are synchronized, a dedicated channel may be established for delay detection. In this manner of establishing a dedicated channel for delay detection, duration of determining the transmission delay is increased, and high overheads are generated.

The electronic device in embodiments of this application may be a NAN device. In other words, the electronic device in embodiments of this application may be replaced by a NAN device.

In view of the foregoing problem, in embodiments of this application, in two electronic devices, one electronic device that sends a discovery beacon frame, a synchronization beacon frame, or a service discovery frame may carry sending time information of the sent frame, and the other electronic device that serves as a receiver may determine a transmission delay between the two electronic devices based on a time point at which the frame is received and the sending time information carried in the frame.

A method for determining a transmission delay provided in an embodiment of this application is described below with reference to the accompanying drawings.

Figure 4:
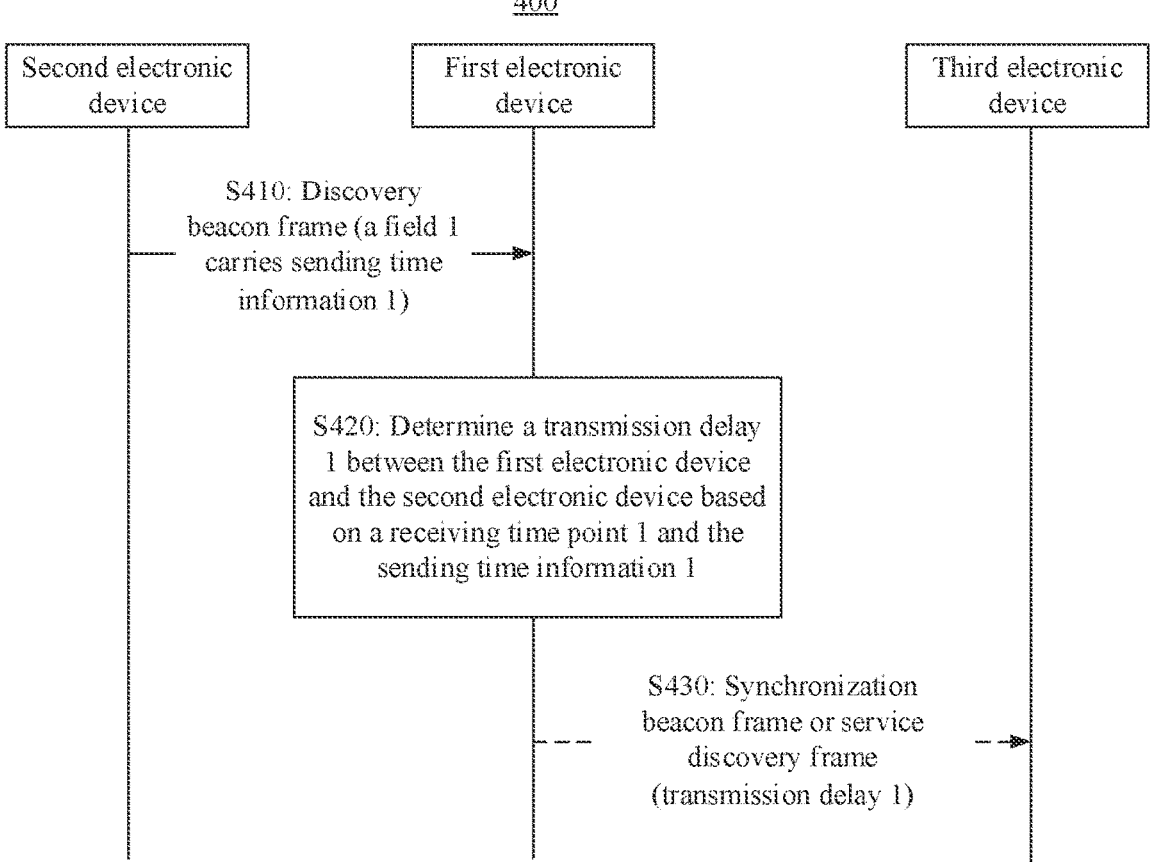
FIG. 4 is a schematic diagram of a method for determining a transmission delay according to an embodiment of this application.

FIG. 4 shows a method 400 for determining a transmission delay according to an embodiment of this application. The method 400 includes the following steps.

S410: A second electronic device sends a discovery beacon frame between DWs, where a field 1 in the discovery beacon frame carries sending time information 1 of the discovery beacon frame sent by the second electronic device. A first electronic device receives the discovery beacon frame at a time point 1. In this case, the first electronic device may discover a NAN cluster to which the second electronic device belongs.

Optionally, the discovery beacon frame may include parameters such as an interval between DWs corresponding to the NAN duster to which the second electronic device belongs, a length of the DW, and a channel resource occupied by an electronic device in the NAN cluster to transmit data.

For example, the second electronic device may be a master device in the NAN cluster.

Optionally, the discovery beacon frame is in an 802.11 beacon frame formal, as shown in Table 1. Table 1 shows fields included in the discovery beacon frame, and lengths, values, and meanings of the fields.

Different values of the NAN attribute (NAN Attributes) field in Table 1 indicate different meanings, as shown in Table 2. The field 1 in the method 400 may be a reserved (Reserved) field for a NAN attribute. A reserved (Reserved) field corresponding to an attribute ID whose value ranges from 14 to 220 or from 222 to 255 in Table 2 may carry the sending time information 1 of the sent discovery beacon frame. For example, the reserved (Reserved) field corresponding to the attribute ID whose value ranges from 14 to 220 or from 222 to 255 may be the foregoing first reserved field.

As shown in Table 2, a synchronization beacon frame corresponds to a third column in Table 2, the discovery beacon frame corresponds to a fourth column in Table 2, and a service discovery frame (service discovery frame, SDF) corresponds to a fifth column in Table 2. In Table 2, YES/M indicates that a corresponding attribute ID is mandatory (mandatory), YES/O indicates that a corresponding attribute ID is optional (optional), NA indicates that a corresponding attribute ID is dispensable, and NO indicates that a corresponding attribute ID does not exist.

Optionally, as shown in Table 3, the field 1 may include an attribute field, a length field, and a sending time field. A bit carried in the attribute field is used to indicate that the field 1 is used to carry the sending time information 1, a bit carried in the length field is used to indicate a length occupied by the sending time field, and a bit carried in the sending time field is used to indicate a sending time point at which the discovery beacon frame is sent. For example, in Table 3, the attribute field may be the foregoing first attribute field, and the length field may be the foregoing first length field.

TABLE 1

| Field (Field) | Length (Octets) | Value (Hex) | Description (Description) |
|---|---|---|---|
| Element ID (Element ID) | 1 | 0xDD | Specifies an information element that is specific to an IEEE 802.11 vendor (vendor specific information element). |
| Length (Length) | 1 | Variable (Variable) | Specifies a length of a next field in the IE. The length field is a variable whose value equals 4 plus a total length of NAN attributes (Length of the following fields in the IE in octets. The length field is a variable, and set to 4 plus the total length of the NAN attributes). |
| Organizationally unique identifier (organizationally unique identifier, OUI) | 3 | 0x50-6F-9A | Specifies an OUI that is specific to the Wi-Fi Alliance (Wi-Fi alliance specific OUI). |
| OUI type | 1 | 0x13 | Identifies a type and version of the NAN IE (Identifying the type and version of the NAN IE). |
| NAN attribute (NAN Attributes) | Variable (Variable) | Variable (Variable) | Specifies one or more NAN attributes (one or more NAN Attributes). |

TABLE 2

| Attribute ID | Description (Description) | NAN beacon frame | | NAN SDF |
|---|---|---|---|---|
| 0 | Master indication attribute (Master Indication Attribute) | Synchronization (synchronization) | Discovery (Discovery) | NO |
| 1 | Cluster attribute (Cluster Attribute) | YES/M | YES/M | NO |
| 2 | Service ID list attribute (Service ID List Attribute) | YES/M | YES/M | NO |
| 3 | Service descriptor attribute (Service Descriptor Attribute) | YES/O | YES/O | YES/M |
| 4 | NAN connection capability attribute (Connection Capability Attribute) | NO | NO | YES/O |
| 5 | WLAN infrastructure attribute (WLAN Infrastructure Attribute) | NO | NO | YES/O |
| 6 | P2P operation attribute (P2P Operation Attribute) | NO | NO | YES/O |
| 7 | IBSS attribute (IBSS Attribute) | NO | NO | YES/O |
| 8 | Mesh attribute (Mesh Attribute) | NO | NO | YES/O |
| 9 | Further NAN service discovery attribute (Further NAN Service Discovery Attribute) | NO | NO | YES/O |
| 10 | Further availability map attribute (Further Availability Map Attribute) | NO | NO | YES/O |
| 11 | Country code attribute (Country Code Attribute) | YES/O | YES/O | YES/O |
| 12 | Ranging attribute (Ranging Attribute) | NO | NO | YES/O |
| 13 | Cluster discovery attribute (Cluster Discovery Attribute) | NO | NO | NO |
| 14-220 | Reserved (Reserved) | NA | NA | NA |
| 221 | Vendor-specific attribute (Vendor Specific Attribute) | YES/O | YES/O | YES/O |
| 222-255 | Reserved (Reserved) | NA | NA | NA |

TABLE 3

| Field (Field) | Length (Octets) | Value (Hex) | Description (Description) |
|---|---|---|---|
| Attribute (Attribute) ID | 1 | 0xDD | Type identifier of a NAN attribute |
| Length (Length) | 2 | Variable (variable) | Length of a next field |
| Sending time (send time) | Variable (variable) | Variable (variable) | Sending time information of the NAN attribute |

S420: The first electronic device determines a transmission delay 1 between the first electronic device and the second electronic device based on the time point 1 and the sending time information 1 that is carried in the field 1.

The following describes how the first electronic device determines the transmission delay 1 between the first electronic device and the second electronic device based on the time point 1 and the sending time information 1 in two cases.

Case 1: The first electronic device is synchronized with the second electronic device. In this case, the first electronic device may determine that a transmission delay determined based on the time point 1 and the sending time information 1 is the transmission delay 1 between the first electronic device and the second electronic device. For example, the first electronic device may determine that a value obtained by subtracting, from the time point 1, sending time indicated by the sending time information 1 is the transmission delay 1 between the first electronic device and the second electronic device. For another example, the first electronic device first calibrates the time point 1 based on time used for processing the discovery beacon frame, and then determines that a value obtained by subtracting, from a calibrated time point 1, the sending information indicated by the sending time information 1 is the transmission delay 1 between the first electronic device and the second electronic device.

Case 2: The first electronic device is not synchronized with the second electronic device. In other words, the second electronic device that sends the discovery beacon frame has been synchronized with other devices in the NAN cluster, but the first electronic device that receives the discovery beacon frame has not been synchronized with other devices in the NAN cluster. In this case, the first electronic device may determine a transmission delay 2 based on the sending time information 1 in the discovery beacon frame and the time point 1. For example, the first electronic device may determine that a value obtained by subtracting, from the time point 1, sending time indicated by the sending time information 1 is the transmission delay 2 between the first electronic device and the second electronic device. For another example, the first electronic device first calibrates the time point 1 based on time used for processing the discovery beacon frame, and then determines that a value obtained by subtracting, from a calibrated time point 1, the sending information indicated by the sending time information 1 is the transmission delay 2 between the first electronic device and the second electronic device. After the first electronic device is synchronized with the second electronic device, the first electronic device calibrates the determined transmission delay 2 based on clock information for clock calibration in a synchronization process, to obtain the transmission delay 1.

In this way, in a process in which the first electronic device transmits data to the second electronic device, the first electronic device may first determine whether the determined transmission delay meets a transmission requirement. If the transmission requirement is met, the data is transmitted. If the transmission requirement is not met, no data is transmitted. Alternatively, the first electronic device transmits the data by selecting, from a plurality of transmission links between the first electronic device and the second electronic device, a transmission link that meets a transmission delay requirement of the data, instead of using Wi-Fi aware. For example, the plurality of links include a cellular transmission link, a Bluetooth transmission link, an NFC transmission link, and the like.

Optionally, the method 400 further includes the following step: S430: The first electronic device may send the determined transmission delay 1 to a third electronic device by using a synchronization beacon frame or a service discovery frame. After receiving the synchronization beacon frame or the service discovery frame, the third electronic device obtains the transmission delay 1 in the synchronization beacon frame or the service discovery frame. The third electronic device may store the transmission delay 1 between the first electronic device and the second electronic device, or send the transmission delay 1 to a next electronic device or the master electronic device in the NAN cluster. If any electronic device that receives the transmission delay 1 needs to transmit data by using Wi-Fi aware, and a data transmission path passes through the first electronic device and the second electronic device, the any electronic device may determine, based on the transmission delay 1, whether the data needs to pass through the first electronic device and the second electronic device. If the master device receives a plurality of transmission delays sent by a plurality of electronic devices, the master device may send the plurality of transmission delays to each electronic device in the NAN cluster. In this way, each electronic device may select, based on the plurality of transmission delays, an appropriate transmission path to transmit data.

Figures 5, 6:
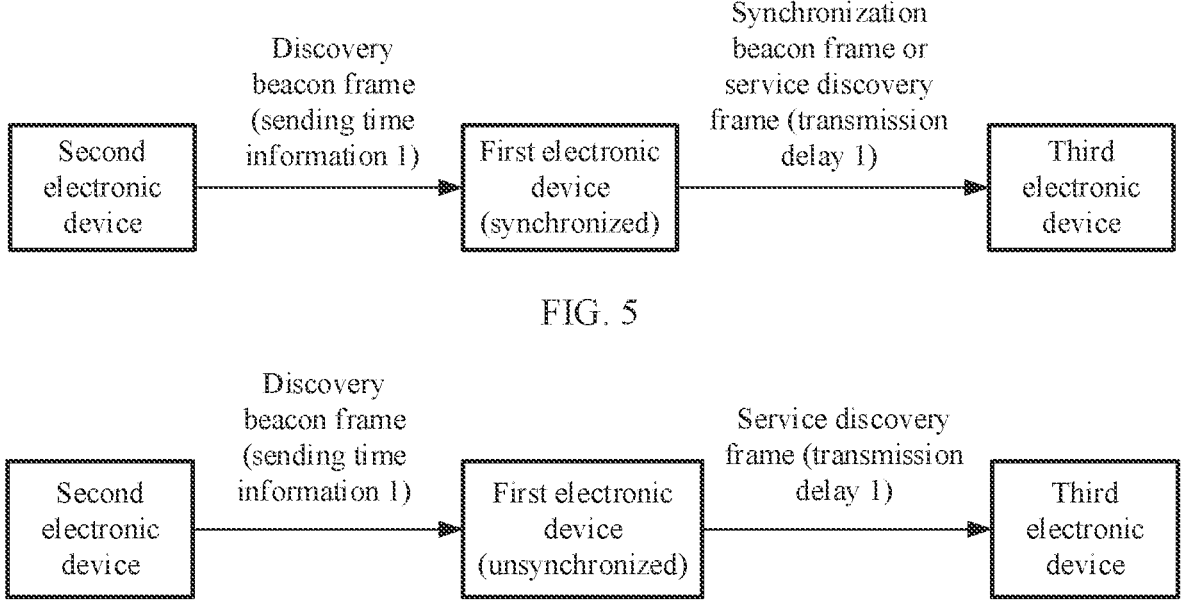
FIG. 5 and FIG. 6 each are a schematic diagram for sending a frame according to an embodiment of this application.

Optionally, the first electronic device may add the determined transmission delay 1 to a reserved field for a NAN attribute in the synchronization beacon frame or the service discovery frame, and send the synchronization beacon frame or the service discovery frame to the third electronic device. Optionally, as shown in FIG. 5, in a process in which the second electronic device sends the discovery beacon frame to the first electronic device, a reserved field in the discovery beacon frame carries the sending time information 1 of the sent discovery beacon frame. If the first electronic device is synchronized with another device in the NAN cluster, the first electronic device may add the determined transmission delay 1 to the reserved field for the NAN attribute in the synchronization beacon frame or the service discovery frame, and send the synchronization beacon frame or the service discovery frame to the third electronic device. Optionally, as shown in FIG. 6, in a process in which the second electronic device sends the discovery beacon frame to the first electronic device, a reserved field in the discovery beacon frame carries the sending time information 1 of the discovery beacon frame. If the first electronic device is not synchronized with another device in the NAN cluster, the first electronic device may add the determined transmission delay 1 to the reserved field for the NAN attribute in the service discovery frame, and send the service discovery frame to the third electronic device.

It may be understood that the third electronic device and the second electronic device may be the same or different. This is not limited in this embodiment of this application.

Optionally, the service discovery frame is in an 802.11 public action frame format, as shown in Table 4. Table 4 shows fields included in the service discovery frame, and lengths, values, and meanings of the fields. For a frame format of the synchronization beacon frame, refer to Table 1.

The frame format shown in Table 1 for the synchronization beacon frame and the discovery beacon frame and the frame format shown in Table 4 for the service discovery frame each include a NAN attribute field. Different values of the NAN attribute field indicate different meanings. A reserved (Reserved) field for the NAN attribute in Table 2 may carry the transmission delay 1. The reserved (Reserved) field corresponding to the attribute ID whose value ranges from 14 to 220 or from 222 to 255 in Table 2 may carry the transmission delay 1 for sending the discovery beacon frame. For example, the reserved (Reserved) field corresponding to the attribute ID whose value ranges from 14 to 220 or from 222 to 255 may be the foregoing second reserved field.

Optionally, the reserved field may include an attribute field, a length field, and a transmission delay field. A bit carried in the attribute field is used to indicate that the reserved field is used to carry the transmission delay 1, a bit carried in the length field is used to indicate a length occupied by the transmission delay field, and a bit carried in the transmission delay field is used to indicate the transmission delay 1. Refer to Table 5. For example, the attribute field in Table 5 may be the foregoing second attribute field, and the length field may be the foregoing second length field.

TABLE 4

| Field (Field) | Length (Octets) | Value (Hex) | Description (Description) |
|---|---|---|---|
| Category (Category) | 1 | 0x04 | Specifies an IEEE 802.11 public action frame (Public action frame). |
| Action field (Action field) | 1 | 0x09 | Specifies a specific vendor of the IEEE 802.11 public action frame (Public action frame vendor specific). |
| OUI | 3 | 0x50-6F-9A | Specifies an OUI that is specific to the Wi-Fi Alliance (Wi-Fi alliance specific OUI). |

TABLE 4-continued

| Field (Field) | Length (Octets) | Value (Hex) | Description (Description) |
|---|---|---|---|
| OUI type | 1 | 0x13 | Identifies a type and version of a NAN IE (Identifying the type and version of the NAN IE). |
| NAN attribute (NAN Attributes) | Variable (Variable) | Variable (Variable) | Specifies one or more NAN attributes (one or more NAN Attributes). |

TABLE 5

| Field (Field) | Length (Octets) | Value (Hex) | Description (Description) |
|---|---|---|---|
| Attribute (Attribute) ID | 1 | 0xFD | Type identifier of a NAN attribute |
| Length (Length) | 2 | Variable (variable) | Length of a next field |
| Transmission delay (transmission delay) | Variable (variable) | Variable (variable) | Transmission delay in the NAN attribute |

Figure 7:
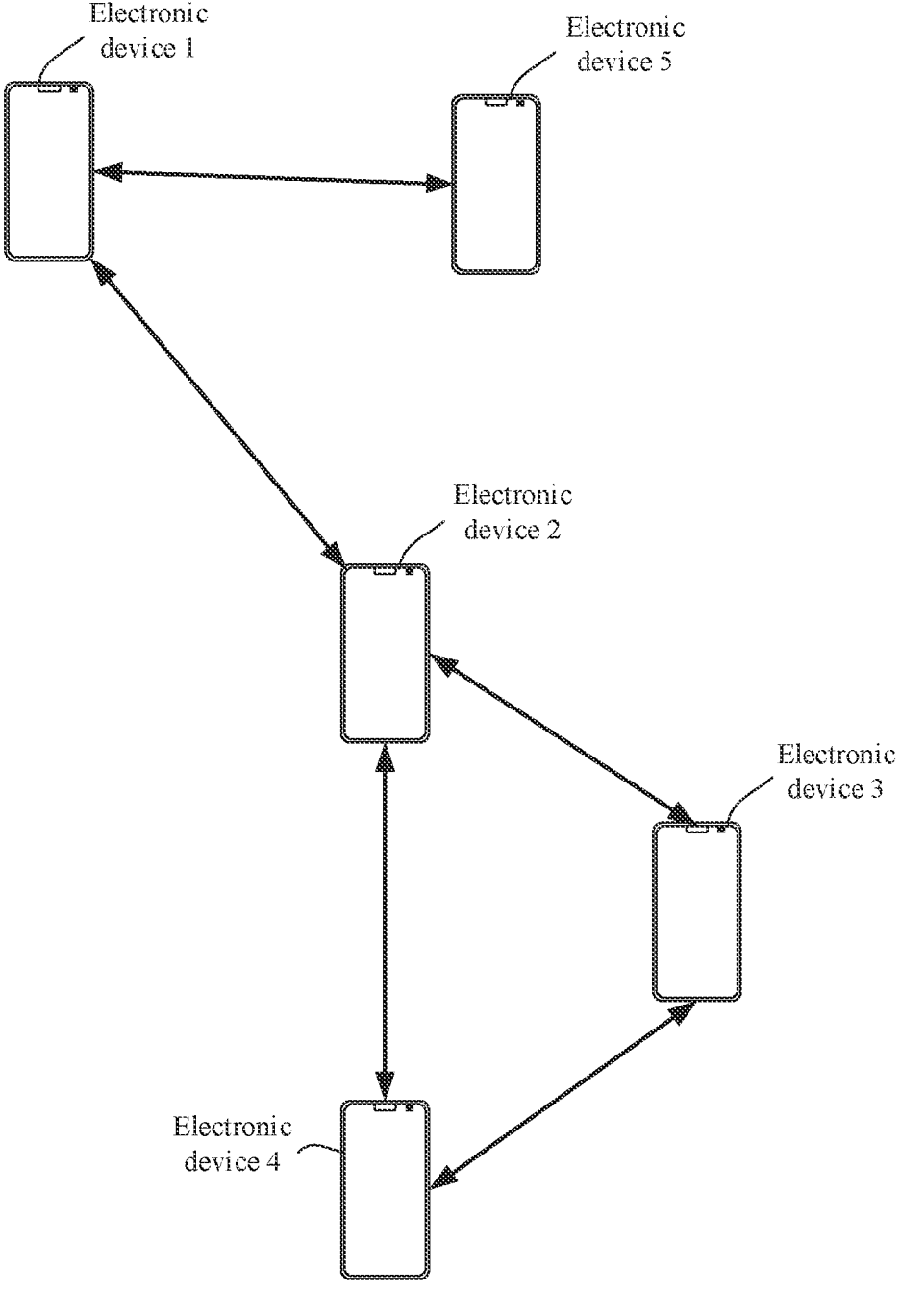
FIG. 7 is a schematic diagram of an application scenario according to an embodiment of this application.

For example, refer to FIG. 7. An electronic device 3 may determine a transmission delay between the electronic device 3 and an electronic device 4 by using the method 400, and may send the determined transmission delay to an electronic device 2. An electronic device 2 may determine, by using the method 400, a transmission delay between the electronic device 2 and the electronic device 4, and a transmission delay between the electronic device 2 and the electronic device 3. The electronic device 2 may send, to an electronic device 1 that serves as a master device in a NAN cluster, the transmission delay that is between the electronic device 3 and the electronic device 4 and that is sent by the electronic device 3 and two transmission delays (the transmission delay between the electronic device 2 and the electronic device 3, and the transmission delay between the electronic device 2 and the electronic device 4) that are determined by the electronic device 2. Alternatively, the electronic device 2 may store the transmission delay between the electronic device 3 and the electronic device 4 and the transmission delays that are determined by the electronic device 2. The electronic device 1 receives, from the electronic device 2, the transmission delay between the electronic device 3 and the electronic device 4, the transmission delay between the electronic device 2 and the electronic device 3, and the transmission delay between the electronic device 2 and the electronic device 4, and send these transmission delays to the electronic device 2, the electronic device 3, the electronic device 4, and the electronic device 5 in a direct or indirect manner. If any electronic device in the NAN cluster needs to transmit data to another electronic device, the any electronic device may select an appropriate transmission path based on different delays on different paths. If the electronic device 1 needs to transmit data to the electronic device 4, the electronic device 1 may compare the transmission delay between the electronic device 2 and the electronic device 4 with a sum of the transmission delay between the electronic device 2 and the electronic device 3 and the transmission delay between the electronic device 3 and the electronic device 4, and select a path with a relatively low transmission delay to transmit the data to the electronic device 4.

Optionally, after the first electronic device receives the discovery beacon frame sent by the second electronic device, the first electronic device may further send a discovery beacon frame, a service discovery frame, or a synchronization beacon frame to a fourth electronic device, where the frame may include sending time information of the frame sent by the first electronic device. The fourth electronic device may determine a transmission delay between the fourth electronic device and the first electronic device based on a time point at which the frame is received and the sending time information included in the frame.

Figure 8:
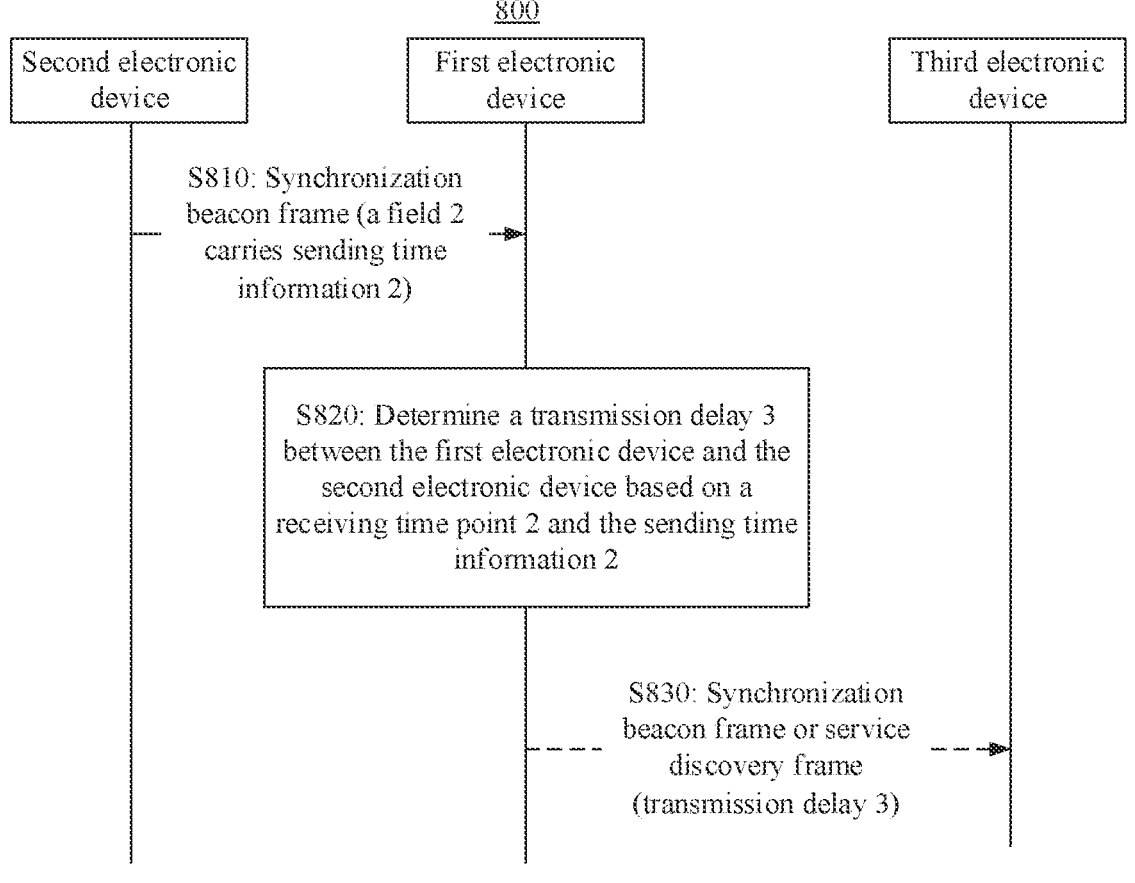
FIG. 8 is a schematic diagram of another method for determining a transmission delay according to an embodiment of this application.

The foregoing method 400 describes a process in which the second electronic device adds, to a reserved field in a discovery beacon frame, sending time information of the sent discovery beacon frame. With reference to FIG. 8, the following describes a process in which the second electronic device adds, to a reserved field in a synchronization beacon frame, sending time information of the sent synchronization beacon frame. FIG. 8 shows another method 800 provided by an embodiment of this application for determining a transmission delay. The method 800 includes the following steps.

S810: A second electronic device sends a synchronization beacon frame within a DW, where a field 2 of the synchronization beacon frame carries sending time information 2 of the synchronization beacon frame sent by the second electronic device. A first electronic device receives the synchronization beacon frame at a time point 2.

For example, the second electronic device may be a master device or a synchronized device in a NAN cluster.

Optionally, the synchronization beacon frame is in an 802.11 beacon frame format, as shown in Table 1. Table 1 shows fields included in the synchronization beacon frame, and lengths, values, and meanings of the fields.

Different values of the NAN attribute (NAN Attributes) field in Table 1 indicate different meanings, as shown in Table 2. The synchronization beacon frame corresponds to a third column in Table 2, Refer to Table 2. The field 2 in the method 800 may be a reserved (Reserved) field for a NAN attribute. A reserved (Reserved) field corresponding to an attribute ID whose value ranges from 14 to 220 or from 222 to 255 in Table 2 may carry the sending time information 2 of a sent discovery beacon frame.

Optionally, the field 2 may include an attribute field, a length field, and a sending time field. A hit carried in the attribute field is used to indicate that the field 2 is used to carry the sending time information 2, a bit carried in the length field is used to indicate a length occupied by the sending time field, and a bit carried in the sending time field is used to indicate a sending time point at which the synchronization beacon frame is sent, as shown in Table 3.

S820: The first electronic device determines a transmission delay 3 between the first electronic device and the second electronic device based on the time point 2 and the sending time information 2 that is carried in the field 2.

The following describes how the first electronic device determines the transmission delay 3 between the first electronic device and the second electronic device based on the time point 2 and the sending time information 2 in two cases.

Case 1: The first electronic device is synchronized with the second electronic device. In this case, the first electronic device may determine that a transmission delay determined based on the time point 2 and the sending time information 2 is the transmission delay 2 between the first electronic device and the second electronic device. For example, the first electronic device may determine that a value obtained by subtracting, from the time point 2, sending time indicated by the sending time information 2 is the transmission delay 3 between the first electronic device and the second electronic device. For another example, the first electronic device first calibrates the time point 2 based on time used for processing the synchronization beacon frame, and then determines that a value obtained by subtracting, from a calibrated time point 2, the sending information indicated by the sending time information 2 is the transmission delay 3 between the first electronic device and the second electronic device.

Case 2: The first electronic device is not synchronized with the second electronic device. In other words, the second electronic device that sends the synchronization beacon frame has been synchronized with other devices in the NAN cluster, but the first electronic device that receives the synchronization beacon frame has not been synchronized with other devices in the NAN cluster. In this case, the first electronic device may determine a transmission delay 4 based on the sending time information 2 in the discovery beacon frame and the time point 2. For example, the first electronic device may determine that a value obtained by subtracting, from the time point 2, sending time indicated by the sending time information 2 is the transmission delay 4 between the first electronic device and the second electronic device. For another example, the first electronic device first calibrates the time point 2 based on time used for processing the synchronization beacon frame, and then determines that a value obtained by subtracting, from a calibrated time point 2, the sending information indicated by the sending time information 2 is the transmission delay 4 between the first electronic device and the second electronic device. After the first electronic device is synchronized with the second electronic device, the first electronic device calibrates the determined transmission delay 4 based on clock information for clock calibration in a synchronization process, to obtain the transmission delay 3.

In this way, in a process in which the first electronic device transmits data to the second electronic device, the first electronic device may first determine whether the determined transmission delay meets a transmission requirement. If the transmission requirement is met, the data is transmitted. If the transmission requirement is not met, no data is transmitted. Alternatively, the first electronic device transmits the data by selecting, from a plurality of transmission links between the first electronic device and the second electronic device, a transmission link that meets a transmission delay requirement of the data, instead of using Wi-Fi aware. For example, the plurality of links include a cellular transmission link, a Bluetooth transmission link, an NFC (near field communication, NFC) transmission link, and the like.

Optionally, the method 800 further includes the following step: S830: The first electronic device may send the determined transmission delay 3 to a third electronic device by using a synchronization beacon frame or a service discovery frame. After receiving the synchronization beacon frame or the service discovery frame, the third electronic device obtains the transmission delay 3 in the synchronization beacon frame or the service discovery frame. The third electronic device may store the transmission delay 3 between the first electronic device and the second electronic device, or send the transmission delay 3 to a next electronic device or the master electronic device in the NAN cluster. If any electronic device that receives the transmission delay 3 needs to transmit data by using Wi-Fi aware, and a data transmission path passes through the first electronic device and the second electronic device, the any electronic device may determine, based on the transmission delay 3, whether the data needs to pass through the first electronic device and the second electronic device. If the master device receives a plurality of transmission delays sent by a plurality of electronic devices, the master device may send the plurality of transmission delays to each electronic device in the NAN cluster. In this way, each electronic device may select, based on the plurality of transmission delays, an appropriate transmission path to transmit data.

Figure 9:
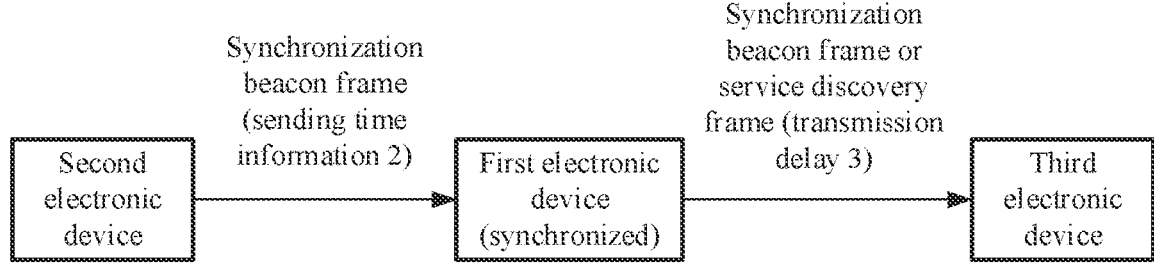
FIG. 9 and FIG. 10 each are a schematic diagram for sending a frame according to an embodiment of this application.
Figure 10:
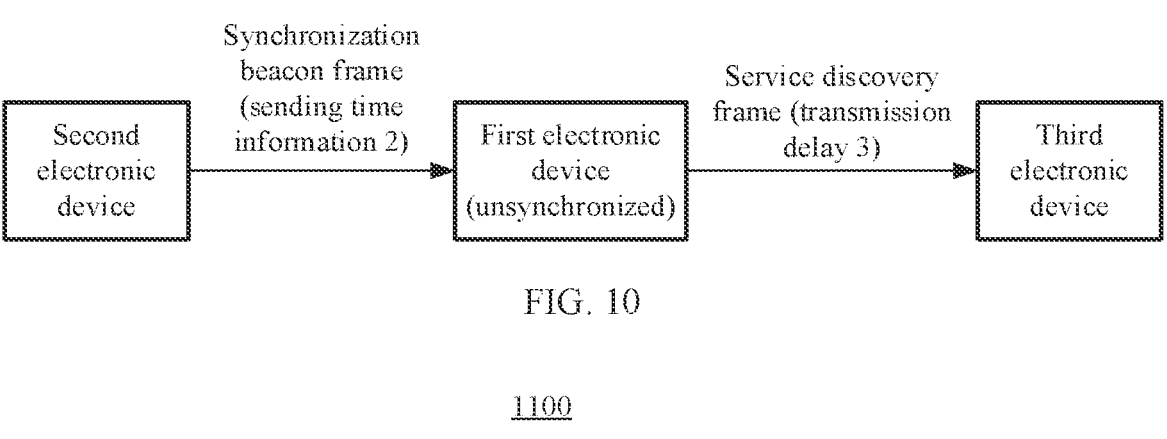

Optionally, the first electronic device may add the determined transmission delay 3 to a reserved field for a NAN attribute in the synchronization beacon frame or the service discovery frame, and send the synchronization beacon frame or the service discovery frame to the third electronic device. Optionally, as shown in FIG. 9, in a process in which the second electronic device sends the synchronization beacon frame to the first device, a reserved field in the synchronization beacon frame carries the sending time information 2 of the sent synchronization beacon frame. If the first electronic device is synchronized with another device in the NAN cluster, the first electronic device may add the determined transmission delay 3 to the reserved field for the NAN attribute in the synchronization beacon frame or the service discovery frame, and send the synchronization beacon frame or the service discovery frame to the third electronic device. Optionally, as shown in FIG. 10, in a process in which the second electronic device sends the synchronization beacon frame to the first device, a reserved field in the synchronization beacon frame carries the sending time information 2 of the sent synchronization beacon frame. If the first electronic device is not synchronized with another device in the NAN cluster, the first electronic device may add the determined transmission delay 3 to the reserved field for the NAN attribute in the service discovery frame, and send the service discovery frame to the third electronic device.

It may be understood that the third electronic device and the second electronic device may be the same or different. This is not limited in this embodiment of this application.

It may be understood that, for frame formats of the synchronization beacon frame and the discovery beacon frame, refer to the description of the method 400.

Similarly, for an example of the transmission delay 3, refer to the description of the example of the transmission delay 1 in FIG. 7.

Optionally, after the first electronic device receives the synchronization beacon frame sent by the second electronic device, the first electronic device may further send a discovery beacon frame, a service discovery frame, or a synchronization beacon frame to a fourth electronic device, where the frame may include sending time information of the frame sent by the first electronic device. The fourth electronic device may determine a transmission delay between the fourth electronic device and the first electronic device based on a time point at which the frame is received and the sending time information included in the frame.

Figure 11:
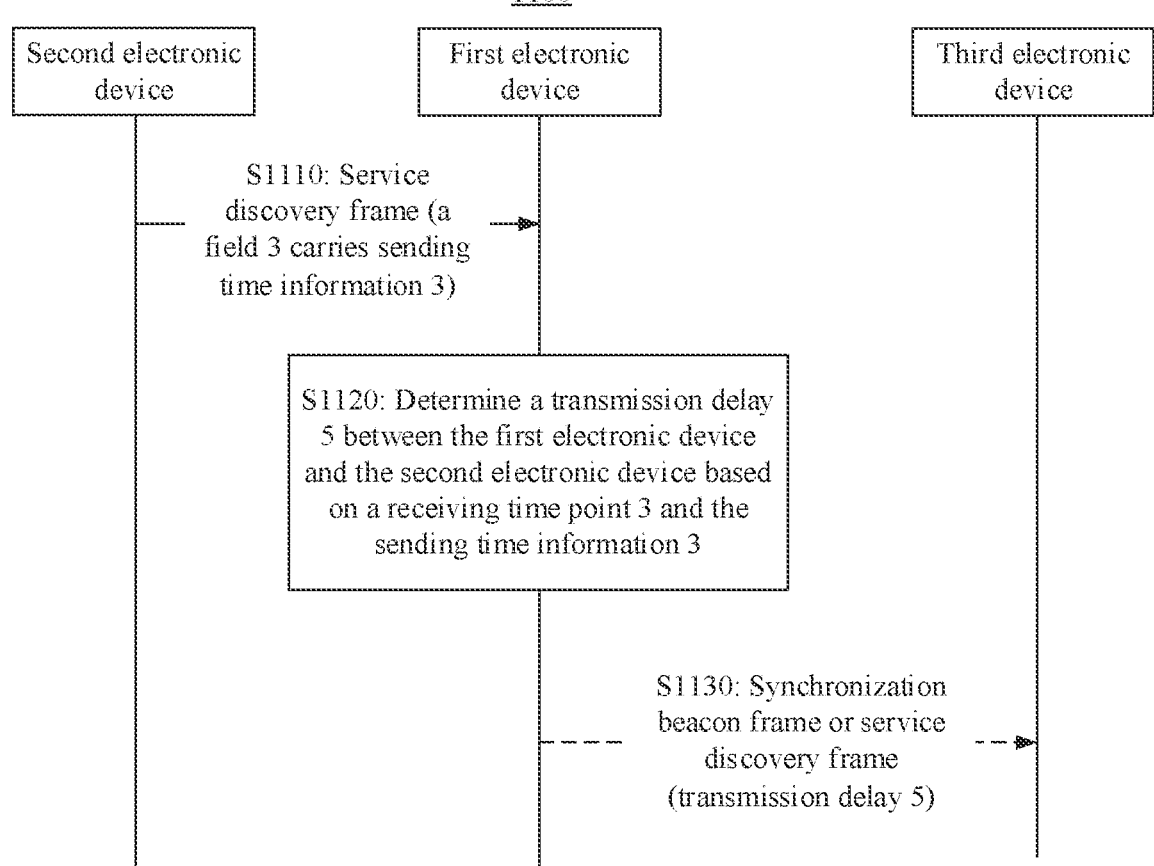
FIG. 11 is a schematic diagram of still another method for determining a transmission delay according to an embodiment of this application.

The foregoing method 400 describes a process in which the second electronic device adds, to a reserved field of a discovery beacon frame, sending time information of the sent discovery beacon frame. The method 800 describes a process in which the second electronic device adds, to a reserved field of a synchronization beacon frame, sending time information of the sent synchronization beacon frame. With reference to FIG. 11, the following describes a process in which the second electronic device adds, to a reserved field of a service discovery frame, sending time information of the service discovery frame. FIG. 11 shows another method 1100 provided by an embodiment of this application for determining a transmission delay. The method 1100 includes the following steps.

S1110: A second electronic device sends a service discovery frame within a DW where a field 3 of the service discovery frame carries sending time information 3 of the service discovery frame sent by the second electronic device. A first electronic device receives the service discovery frame at a time point 3.

For example, the second electronic device may be any electronic device in a NAN cluster or an electronic device that is outside the NAN cluster and that has not been synchronized with an electronic device in the NAN cluster.

Optionally, the service discovery frame is in an 802.11 public action frame format, as shown in Table 4. Table 4 shows fields included in the service discovery frame, and lengths, values, and meanings of the fields.

Different values of the NAN attribute (NAN Attributes) field in Table 4 indicate different meanings, as shown in Table 2. The service discovery beacon frame corresponds to a fifth column in Table 2. Refer to Table 2. The field 3 in the method 1100 may be a reserved (Reserved) field for a NAN attribute. A reserved (Reserved) field corresponding to an attribute ID whose value ranges from 14 to 220 or from 222 to 255 in Table 2 may carry the sending time information 3 of the sent service discovery frame.

Optionally, the field 2 may include an attribute field, a length field, and a sending time field. A bit carried in the attribute field is used to indicate that the field 2 is used to carry the sending time information 2, a bit carried in the length field is used to indicate a length occupied by the sending time field, and a bit carried in the sending time field is used to indicate a sending time point at which the synchronization beacon frame is sent, as shown in Table 3.

S1120: The first electronic device determines a transmission delay 5 between the first electronic device and the second electronic device based on the time point 3 and the sending time information 3 that is carried in the field 3.

The following describes how the first electronic device determines the transmission delay 5 between the first electronic device and the second electronic device based on the time point 3 and the sending time information 3 in two cases.

Case 1: The first electronic device is synchronized with the second electronic device. In this case, the first electronic device may determine that a transmission delay determined based on the time point 3 and the sending time information 3 is the transmission delay 3 between the first electronic device and the second electronic device. For example, the first electronic device may determine that a value obtained by subtracting, from the time point 3, sending time indicated by the sending time information 3 is the transmission delay 5 between the first electronic device and the second electronic device. For another example, the first electronic device first calibrates the time point 3 based on time used for processing the service discovery frame, and then determines that a value obtained by subtracting, from a calibrated time point 3, the sending information indicated by the sending time information 3 is the transmission delay 5 between the first electronic device and the second electronic device.

Case 2: The first electronic device is not synchronized with the second electronic device. In other words, the second electronic device that sends the service discovery frame has been synchronized with other devices in the NAN cluster, but the first electronic device that receives the service discovery frame has not been synchronized with other devices in the NAN cluster. In this case, the first electronic device may determine a transmission delay 6 based on the sending time information 3 in the service discovery frame and the time point 3. For example, the first electronic device may determine that a value obtained by subtracting, from the time point 3, sending time indicated by the sending time information 3 is the transmission delay 6 between the first electronic device and the second electronic device. For another example, the first electronic device first calibrates the time point 3 based on time used for processing the service discovery frame, and then determines that a value obtained by subtracting, from a calibrated time point 3, the sending information indicated by the sending time information 3 is the transmission delay 6 between the first electronic device and the second electronic device, After the first electronic device is synchronized with the second electronic device, the first electronic device calibrates the determined transmission delay 6 based on clock information for clock calibration in a synchronization process, to obtain the transmission delay 5.

In this way, in a process in which the first electronic device transmits data to the second electronic device, the first electronic device may first determine whether the determined transmission delay meets a transmission requirement. If the transmission requirement is met, the data is transmitted. If the transmission requirement is not met, no data is transmitted. Alternatively, the first electronic device transmits the data by selecting, from a plurality of transmission links between the first electronic device and the second electronic device, a transmission link that meets a transmission delay requirement of the data, instead of using Wi-Fi aware. For example, the plurality of links include a cellular transmission link, a Bluetooth transmission link, an NFC transmission link, and the like.

Optionally, the method 1100 further includes the following step: S1130: The first electronic device may send the determined transmission delay 5 to a third electronic device by using a synchronization beacon frame or a service discovery frame. After receiving the synchronization beacon frame or the service discovery frame, the third electronic device obtains the transmission delay 3 in the synchronization beacon frame or the service discovery frame. The third electronic device may store the transmission delay 5 between the first electronic device and the second electronic device, or send the transmission delay 5 to a master electronic device in the NAN cluster. If any electronic device that receives the transmission delay 5 needs to transmit data by using Wi-Fi aware, and a data transmission path passes through the first electronic device and the second electronic device, the any electronic device may determine, based on the transmission delay 5, whether the data needs to pass through the first electronic device and the second electronic device. If the master device receives a plurality of transmission delays sent by a plurality of electronic devices, the master device may send the plurality of transmission delays to each electronic device in the NAN cluster. In this way, each electronic device may select, based on the plurality of transmission delays, an appropriate transmission path to transmit data.

Figure 12:
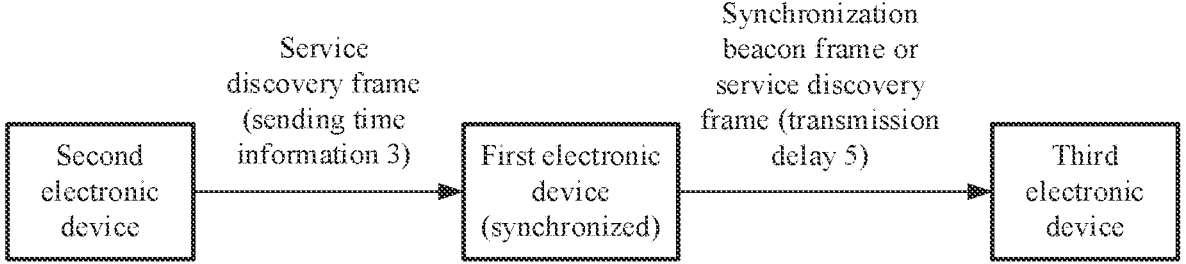
FIG. 12 and FIG. 13 each are a schematic diagram for sending a frame according to an embodiment of this application.
Figure 13:
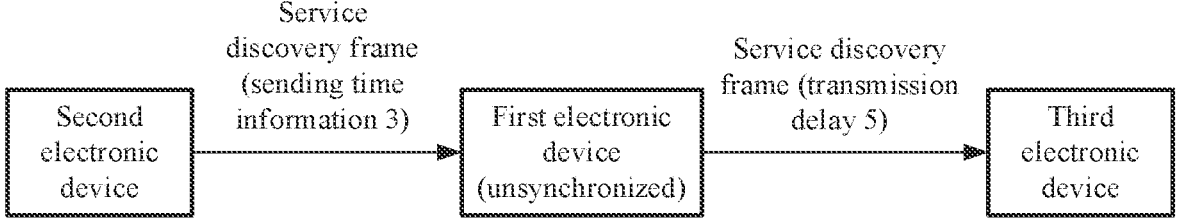

Optionally, the first electronic device may add the determined transmission delay 5 to a reserved field for a NAN attribute in the synchronization beacon frame or the service discovery frame, and send the synchronization beacon frame or the service discovery frame to the third electronic device. Optionally, as shown in FIG. 12, in a process in which the second electronic device sends the synchronization beacon frame to the first device, a reserved field in the synchronization beacon frame carries the sending time information 3 of the sent synchronization beacon frame. If the first electronic device is synchronized with another device in the NAN cluster, the first electronic device may add the determined transmission delay 5 to the reserved field for the NAN attribute in the synchronization beacon frame or the service discovery frame, and send the synchronization beacon frame or the service discovery frame to the third electronic device. Optionally, as shown in FIG. 13, in a process in which the second electronic device sends the synchronization beacon frame to the first device, a reserved field in the synchronization beacon frame carries the sending time information 3 of the sent synchronization beacon frame. If the first electronic device is not synchronized with another device in the NAN cluster, the first electronic device may add the determined transmission delay 5 to the reserved field for the NAN attribute in the service discovery frame, and send the service discovery frame to the third electronic device.

It may be understood that the third electronic device and the second electronic device may be the same or different. This is not limited in this embodiment of this application.

It may be understood that, for frame formats of the synchronization beacon frame and the discovery beacon frame, refer to the description of the method 400.

Optionally, after the first electronic device receives the discovery beacon frame sent by the second electronic device, the first electronic device may further send a discovery beacon frame, a service discovery frame, or a synchronization beacon frame to a fourth electronic device, where the frame nay include sending time information of the frame sent by the first electronic device. The fourth electronic device may determine a transmission delay between the fourth electronic device and the first electronic device based on a time point at which the frame is received and the sending time information included in the frame.

It may be understood that in this embodiment of this application, both the first electronic device and the second electronic device can determine a transmission delay between the first electronic device and the second electronic device. If the third electronic device can receive a transmission delay sent by the first electronic device and also a transmission delay sent by the second electronic device, the third electronic device may calibrate two different transmission delays, perform weighted calculation, and determine a transmission delay obtained after weighted calculation as the transmission delay between the first electronic device and the second electronic device. For example, a transmission delay that is earlier received has a lower weight coefficient, and a transmission delay that is later received has a higher weight coefficient.

Optionally, the foregoing first frame is the discovery beacon frame in the method 400, the foregoing first field may be the field 1 in the method 400, the foregoing first sending time information may be the sending time information 1 in the method 400, the foregoing first transmission delay is the transmission delay 1 in the method 400, the foregoing first time point is the time point 1 in the method 400, the foregoing second transmission delay is the transmission delay 2 in the method 400, and the foregoing second frame is the synchronization beacon frame or the service discovery frame that carries the transmission delay 1 in the method 400. Alternatively, the foregoing first frame is the synchronization beacon frame in the method 800, the foregoing first field may be the field 2 in the method 800, the foregoing first sending information may be the sending time information 2 in the method 800, the foregoing first transmission delay is the transmission delay 3 in the method 800, the foregoing first time point is the time point 2 in the method 800, the foregoing second transmission delay is the transmission delay 4 in the method 800, and the foregoing second frame is the synchronization beacon frame or the service discovery frame that carries the transmission delay 3 in the method 800. Alternatively, the foregoing first frame is the service discovery frame in the method 1100, the foregoing first field may be the field 3 in the method 1100, the foregoing first sending information may be the sending time information 3 in the method 1100, the foregoing first transmission delay is the transmission delay 5 in the method 1100, the foregoing first time point is the time point 3 in the method 1100, and the foregoing second transmission delay is the transmission delay 6 in the method 1100, and the foregoing second frame is the synchronization beacon frame or the service discovery frame that carries the transmission delay 5 in the method 1100.

It should be understood that the field 1 in the method 400, the field 2 in the method 800, and the field 3 in the method 1100 may be different fields or different values of a same field. For example, the field 1 may be a reserved field whose value ranges from 12 to 220, and the field 2 may be the reserved field whose value ranges from 222 to 255.

It should be noted that lengths occupied by fields in Table 3 and Table 5 are merely examples. In addition, values and lengths for the attribute field in the field 1, the attribute field in the field 2, and the attribute field in the field 3 may be the same or different. Values and lengths for the length field of the field 1, the length field of the field 2, and the length field of the field 3 may be the same or different. Values and lengths for the sending time field of the field 1, the sending time field of the field 2, and the time field of the field 3 may be the same or different.

It should also be noted that the method 400, the method 800, and the method 1100 are independent embodiments or may be embodiments that may be mutually referenced. Second electronic devices in the method 400, the method 800, and the method 1100 may be different electronic devices or may be a same electronic device. First electronic devices in the method 400, the method 800, and the method 1100 may be different electronic devices or may be a same electronic device. This is not limited in embodiments of this application.

The foregoing describes, with reference to FIG. 1 to FIG. 13, embodiments of methods for determining a transmission delay according to embodiments of this application. The following describes an embodiment of an apparatus for determining a transmission delay according to an embodiment of this application.

In this embodiment, functional modules of each electronic device may be obtained through division based on the foregoing method examples. For example, each functional module may be obtained through division based on each function, or two or more functions may be integrated into one processing module. The integrated module may be implemented in a form of hardware. It should be noted that module division in this embodiment is an example and is merely logical function division. In actual implementation, there may be another division manner.

It should be noted that all related content of the steps in the foregoing method embodiments may be cited in function description of corresponding functional modules. Details are not described herein.

Each electronic device provided in this embodiment is configured to perform the foregoing method for determining a transmission delay, and therefore can achieve a same effect as the foregoing implementation method. When an integrated unit is used, each electronic device may include a processing module, a storage module, and a communications module. The processing module may be configured to control and manage an action of each electronic device. For example, the processing module may be configured to support the electronic device in performing steps performed by a processing unit. The storage module may be configured to support a client and a server in storing program code, data, and the like. The communications module may be configured to support the client and the server in communicating with another device.

The processing module may be a processor or a controller. The processor may, implement or execute various example logical blocks, modules, and circuits described with reference to content disclosed in this application. Alternatively, the processor may be a combination implementing a computing function, for example, a combination of one or more microprocessors, a combination of a digital signal processor (digital signal processing, DSP) and a microprocessor, or the like. The storage module may be a memory. The communications module may be specifically a device, for example, a radio frequency circuit, a Bluetooth chip, a Wi-Fi chip, or the like that interacts with another electronic device.

Figure 14:
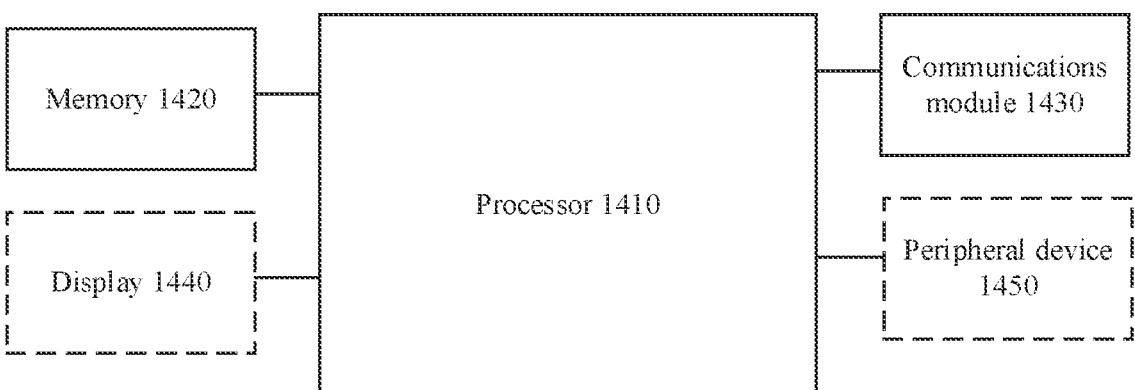
FIG. 14 is a schematic diagram of an apparatus for determining a transmission delay according to an embodiment of this application.

In an embodiment, if the processing module is a processor and the storage module is a memory, the electronic device in this embodiment may be a device having a structure shown in FIG. 14. For example, FIG. 14 is a schematic diagram depicting a structure of an electronic device 1400 according to an embodiment of this application. The electronic device 1400 may be the first electronic device, the second electronic device, the third electronic device, or the fourth electronic device in the method embodiments. The electronic device 1400 may include a processor 1410, a memory 1420, a communications module 1430, and the like.

The processor 1410 may include one or more processing units. The memory 1420 is configured to store program code and data. In this embodiment of this application, the processor 1410 may execute computer-executable instructions stored in the memory 1420, to control and manage an action of the electronic device 1400.

The communications module 1430 may be configured to implement communication between internal modules of the electronic device 1400, or communication between the electronic device 1400 and an external electronic device. For example, if the electronic device 1400 communicates with another electronic device in a wired connection manner, the communications module 1430 may include an interface, for example, a USB interface. The USB interface may be an interface that conforms to the USB standard specification, and may be specifically a mini USB interface, a micro USB interface, a USB Type-C interface, or the like. The USB interface may be configured to connect to a charger to charge the electronic device 1400, may be configured to transmit data between the electronic device 1400 and a peripheral device, or may be configured to connect to a headset for playing audio through the headset. The interface may be further configured to connect to another electronic device such as an AR device.

Alternatively, the communications module 1430 may include an audio component, a radio frequency circuit, a Bluetooth chip, a wireless fidelity (wireless fidelity, Wi-Pi) chip, a near-field wireless communication (near-field communication, NFC) module, and the like, and may implement interaction between the electronic device 1400 and another electronic device in various manners.

Optionally, the electronic device 1400 may further include a display 1440. The display 1440 may display an image, a video, or the like in a human-computer interaction interface.

Optionally, the electronic device 1400 may further include a peripheral device 1450 such as a mouse, a keyboard, a speaker, or a microphone.

It should be understood that, in addition to the various components or modules shown in FIG. 14, a structure of the electronic device 1400 is not specifically limited in this embodiment of this application. In other embodiments of this application, the electronic device 1400 may further include more or fewer components than those shown in the figure, or combine some components, or split some components, or have different component layouts. The components shown in the figure may be implemented by hardware, software, or a combination of software and hardware.

An embodiment further provides a computer-readable storage medium. The computer-readable storage medium stores computer instructions, and when the computer instructions run on an electronic device, the electronic device is enabled to perform the foregoing related method steps, to implement the method for determining a transmission delay in the foregoing embodiments.

An embodiment further provides a computer program product. When the computer program product runs on a computer, the computer is enabled to perform the foregoing related steps, to implement the method for determining a transmission delay in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the method for determining a transmission delay in the foregoing method embodiments.

The electronic device, the computer storage medium, the computer program product, or the chip provided in the embodiments is configured to perform the corresponding method provided above. Therefore, for beneficial effects that can be achieved, refer to the beneficial effects of the corresponding method provided above. Details are not described herein.

Based on the descriptions about the foregoing implementations, a person skilled in the art may understand that, for a purpose of convenient and brief description, division into the foregoing functional modules is used as an example for illustration. In actual application, the foregoing functions may be allocated to different functional modules and implemented based on requirements. In other words, an inner structure of an apparatus is divided into different functional modules to implement all or some of the functions described above.

In the embodiments provided in this application, it should be understood that the disclosed apparatus and method may be implemented in other manners. For example, the described apparatus embodiment is merely an example. For example, division into modules or units is merely logical function division and may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. The parts displayed as units may be one or more physical units, which may be located in one place, or may be distributed on different places. Some or all of the units may be selected based on actual requirements to achieve the objectives of the solutions of embodiments.

In addition, functional units in embodiments of this application may be integrated into one processing unit, each of the units may exist independently and physically, or two or more units may be integrated into one unit. The integrated unit may be implemented in a form of hardware, or may be implemented in a form of a soft ware functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A method implemented by a first electronic device, wherein the method comprises:
   receiving, from a second electronic device, a first frame at a first time point, wherein the first frame comprises a first field carrying first sending time information of the first frame, and wherein the first frame is a device discovery beacon frame, a synchronization beacon frame, or a service discovery frame of neighbor awareness networking (NAN); and
   determining a first transmission delay of a first transmission link that is between the first electronic device and the second electronic device based on the first time point and the first sending time information, wherein when the first transmission delay does not meet a transmission requirement, the method further comprises:
      selecting a second transmission link that is between the first electronic device and the second electronic device and that has a second transmission delay that meets the transmission requirement; and
      transmitting data to the second electronic device via the second transmission link.

2. The method of claim 1, wherein the first field is a first reserved field for a NAN attribute field in the first frame.

3. The method of claim 1, wherein the first field comprises a first attribute field comprising a first bit indicating that the first field is carrying the first sending time information, a sending time field comprising a second bit indicating a sending time point at which the second electronic device sends the first frame, and a first length field comprising a third bit indicating a length of the sending time field.

4. The method of claim 1, wherein when the first electronic device is not synchronized with the second electronic device, determining the first transmission delay comprises:
      determining a third transmission delay between the first electronic device and the second electronic device based on the first time point and the first sending time information; and
      calibrating, after the first electronic device is synchronized with the second electronic device, the third transmission delay based on clock information for calibration in a synchronization process to obtain the first transmission delay.

5. The method of claim 1, further comprising sending, to a third electronic device, a second frame carrying a second field comprising the first transmission delay, wherein the second frame is a synchronization beacon frame or a service discovery frame of NAN.

6. The method of claim 5, wherein the second field is a second reserved field for a NAN attribute field in the second frame.

7. The method of claim 5, wherein the second field comprises a second attribute field comprising a first bit indicating that the second field is carrying the first sending time information, a transmission delay field comprising a second bit indicating the first transmission delay, and a second length field comprising a third bit indicating a length of the transmission delay field.

8. The method of claim 1, further comprising sending, to a fourth electronic device, a third frame comprising a third field carrying second sending time information of the third frame, wherein a fourth transmission delay between the fourth electronic device and the first electronic device is based on the second sending time information, and wherein the third frame is a service discovery frame, a synchronization beacon frame, or a device discovery beacon frame.

9. A first electronic device, comprising:
   a memory configured to store instructions; and
   one or more processors coupled to the memory and configured to:
      receive, from a second electronic device, a first frame sent at a first time point, wherein the first frame comprises a first field carrying first sending time information of the first frame received from the second electronic device, and wherein the first frame is a device discovery beacon frame, a synchronization beacon frame, or a service discovery frame of neighbor awareness networking (NAN); and determine a first transmission delay of a first transmission link that is between the first electronic device and the second electronic device based on the first time point and the first sending time information, wherein when the first transmission delay does not meet a transmission requirement, the one or more processors are further configured to:

select a second transmission link that is between the first electronic device and the second electronic device and that has a second transmission delay that meets the transmission requirement; and transmit data to the second electronic device via the second transmission link.

10. The first electronic device of claim 9, wherein the first field is a first reserved field for a NAN attribute field in the first frame.

11. The first electronic device of claim 9, wherein the first field comprises a first attribute field comprising a first bit indicating that the first field is carrying the first sending time information, a sending time field comprising a second bit indicating a sending time point at which the second electronic device sends the first frame, and a first length field comprising a third bit indicating a length of the sending time field.

12. The first electronic device of claim 9, wherein the one or more processors are further configured to:

determine a third transmission delay between the first electronic device and the second electronic device based on the first time point and the first sending time information; and calibrate the third transmission delay based on clock information for calibration in a synchronization process to obtain the first transmission delay when the first electronic device is synchronized with the second electronic device.

13. The first electronic device of claim 9, wherein the one or more processors are further configured to send, to a third electronic device, a second frame comprising a second field carrying the first transmission delay, wherein the second frame is a synchronization beacon frame or a service discovery frame of NAN.

14. The first electronic device of claim 13, wherein the second field is a second reserved field for a NAN attribute field in the second frame.

15. The first electronic device of claim 13, wherein the second field comprises a second attribute field comprising a first bit indicating that the second field is carrying the first transmission delay, a transmission delay field comprising a second bit indicating the first transmission delay, and a second length field comprising a third bit indicating a length occupied by the transmission delay field.

16. The first electronic device of claim 9, wherein the one or more processors are further configured to send, to a fourth electronic device, a third frame comprising a third field carrying second sending time information of the third frame, wherein a fourth transmission delay between the fourth electronic device and the first electronic device is based on the second sending time information, and wherein the third frame is a service discovery frame, a synchronization beacon frame, or a device discovery beacon frame.

17. A computer program product comprising computer-executable instructions that are stored on a non-transitory computer-readable storage medium and that, when executed by one or more processors, cause a first electronic device to:

receive, from a second electronic device, a first frame at a first time point, wherein the first frame comprises a first field carrying first sending time information of the first frame received from the second electronic device, and wherein the first frame is a device discovery beacon frame, a synchronization beacon frame, or a service discovery frame of neighbor awareness networking (NAN); and determine a first transmission delay of a first transmission link that is between the first electronic device and the second electronic device based on the first time point and the first sending time information, wherein when the first transmission delay does not meet a transmission requirement, the instructions when executed by the one or more processors are, further cause the first electronic device to:

select a second transmission link that is between the first electronic device and the second electronic device and that has a second transmission delay that meets the transmission requirement; and transmit data to the second electronic device via the second transmission link.

18. The computer program product of claim 17, wherein the first field comprises a first attribute field comprising a first bit indicating that the first field is carrying the first sending time information, a sending time field comprising a second bit indicating a sending time point at which the second electronic device sends the first frame, and a first length field indicating a length of the sending time field.

19. The computer program product of claim 17, wherein the instructions when executed by the one or more processors, further cause the first electronic device to:

determine a third transmission delay between the first electronic device and the second electronic device based on the first time point and the first sending time information; and calibrate the third transmission delay based on clock information for calibration in a synchronization process to obtain the first transmission delay after the first electronic device is synchronized with the second electronic device.

20. The computer program product of claim 17, wherein the instructions when executed by the one or more processors, further cause the first electronic device to send, to a third electronic device, a second frame comprising, a second field carrying the first transmission delay, wherein the second frame is a synchronization beacon frame or a service discovery frame of NAN.

* * * * *